United States Patent [19]

Collins

[11] Patent Number: 5,210,972

[45] Date of Patent: May 18, 1993

[54] FISHING LINE RELEASE DEVICE

[76] Inventor: James R. Collins, 7710 Windswept La., Houston, Tex. 77063

[21] Appl. No.: 874,644

[22] Filed: Apr. 27, 1992

[51] Int. Cl.⁵ .............................................. A01K 87/00
[52] U.S. Cl. ...................................... 43/25; 242/323; 43/19
[58] Field of Search ................. 43/25, 19, 20, 19.2; 242/323, 309, 233

[56] References Cited

U.S. PATENT DOCUMENTS

| | | | |
|---|---|---|---|
| 2,765,568 | 10/1956 | Kozar | 43/19 |
| 2,843,963 | 7/1958 | Butehorn | 43/25 |
| 3,142,127 | 7/1964 | Mason | 43/19 |
| 3,143,823 | 8/1964 | Brown et al. | 43/19 |
| 3,217,442 | 11/1965 | Nygren | 43/19 |
| 3,256,633 | 6/1966 | Smith | 43/25 |
| 3,436,858 | 4/1969 | Shaffer | 43/19 |
| 3,643,367 | 2/1972 | Denny et al. | 43/25 |
| 3,711,036 | 1/1973 | Spraggins | 242/323 |
| 3,754,346 | 8/1973 | Worsham | 43/19 |
| 4,558,535 | 12/1985 | Eldridge | 242/323 |

Primary Examiner—Richard K. Seidel
Assistant Examiner—Chuck Y. Mah
Attorney, Agent, or Firm—David A. Rose

[57] ABSTRACT

The present invention discloses a device that can be affixed to a conventional fishing rod having a reel, a bail, a fishing line, and a lure, said device being capable of engaging the fishing line when the bail is released, maintaining engagement of the line while the rod is flexed and released, and releasing the line instantly when the line becomes slack, so that the lure is cast forward by the straightening of the rod and then allowed to travel on a trajectory that is unrestrained by the line.

21 Claims, 2 Drawing Sheets

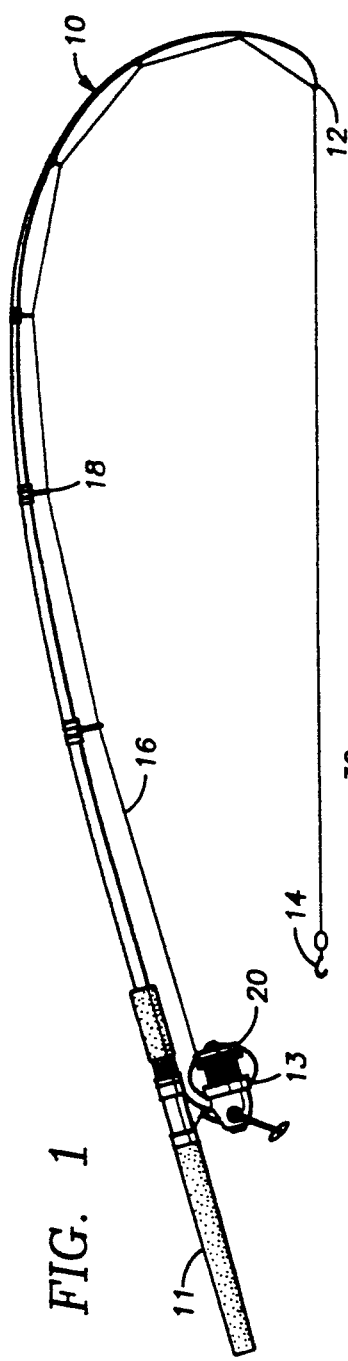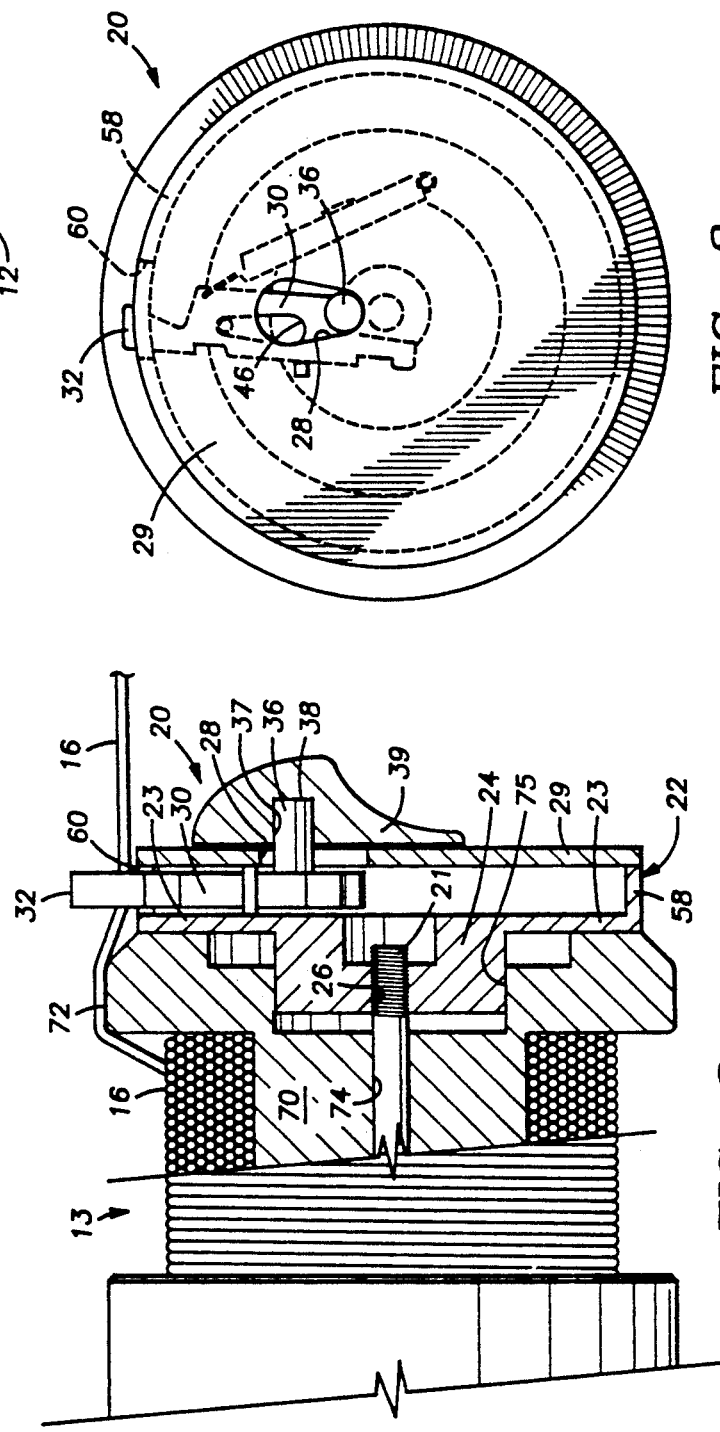

FISHING LINE RELEASE DEVICE

TECHNICAL FIELD OF THE INVENTION

The present invention relates to fishing equipment, and, more particularly, to devices for holding and releasing a fishing line during casting. Still more particularly, the present invention discloses a line release mechanism that can be affixed to a fishing reel and that releases the line from the reel at precisely the moment required to ensure maximum projection of the lure.

BACKGROUND OF THE INVENTION

Devices for casting fishing lures are well known in the art. Commonly, devices for applying an outward thrust to the lure and line fall into two categories. The first comprises devices which cock the rod relative to the rod grip and then apply a torque so that the rod tip is thrust forward, thereby simulating a cast. In this category the rod is not flexed as part of the cast. The second category comprises mechanisms for flexing, or bending, the rod and then releasing the rod and the line in a manner that allows the lure to be cast.

A disadvantage of the known casting apparatuses is that they often require the operator to switch hands or to timely operate line releasing devices which are relatively complex or difficult to handle. The present invention avoids the deficiencies of the prior art and provides a simple and effective line releasing mechanism to be used in conjunction with a flex-type casting method.

Other objects and advantages of the invention will appear from the following description.

SUMMARY OF THE INVENTION

The device of the present invention includes a locking bar that is capable of being latched in a sequence of positions, each of which is relevant to the sequence of events that occur when a lure is cast by the method of flexing and releasing a fishing rod. The bar is housed in a casing that includes an arrangement of posts. The posts engage corresponding elements of the bar and hold the bar sequentially in its uncocked, cocked, and activated positions, until it returns, under spring force, to its original uncocked position when the tension in the fishing line is released.

The present invention, when attached to the face of the line spool on an open faced spinning reel, will allow the bait or lure to be cast with minimal action and no special expertise on the part of the operator. By releasing the line at a time determined by the tension in the line itself, rather than at a time determined by the mechanical movement of a trigger mechanism, the line releasing mechanism is adaptable to a variety of rod types and is not dependent on expertise of the fisherman.

The principal object of this invention is to provide the fisherman with a simple add-on automatic device that will allow the fisherman to cast the lure without swinging the entire rod, as may be desirable in crowded circumstances or in heavy brush or trees.

A further object of this invention is to allow the fisherman the flexibility of casting varied distances of his own choice and also the capability to cast much further than any underhanded casting technique.

A still further object of this invention is to provide the fisherman a quick, simple method for making rapid repetitive casts that does not require the operator to engage complex mechanical parts or to shift hands in operating the fishing rod.

A still further object of this invention is to allow the fisherman to make desired changes in lure weight or size without having to additionally modify the reel, rod, or line, adjust the device, or alter the timing of the release mechanism in any way.

An additional object of this invention is to allow the fisherman to use almost any commercially available rod of his preferred flexibility and strength and still have precisely timed positive line release at the moment the lure passes the rod tip.

An additional object of this invention is to supply manufacturers with an efficient cost effective timing device that can also be manufactured as an integral or optional part of all open-faced spinning reels.

A still further object of this invention is to provide the handicapped or uncoordinated person with an economical method for efficiently casting a lure.

These and other objects of the present invention will become apparent from the accompanying drawings, specifications, and claims which are a part of this application.

BRIEF DESCRIPTION OF THE DRAWINGS

For a detailed description of a preferred embodiment of the invention, reference will now be made to the accompanying drawings wherein:

FIG. 1 is a side view of a conventional fishing rod and reel with a line release mechanism of the present invention attached and the rod in a flexed position;

FIG. 2 is a side view partially in cross-section of the line release mechanism mounted on a spool;

FIG. 3 is a front view of the line release mechanism of the present invention.

DETAILED DESCRIPTION OF A PREFERRED EMBODIMENT

Figure 5:
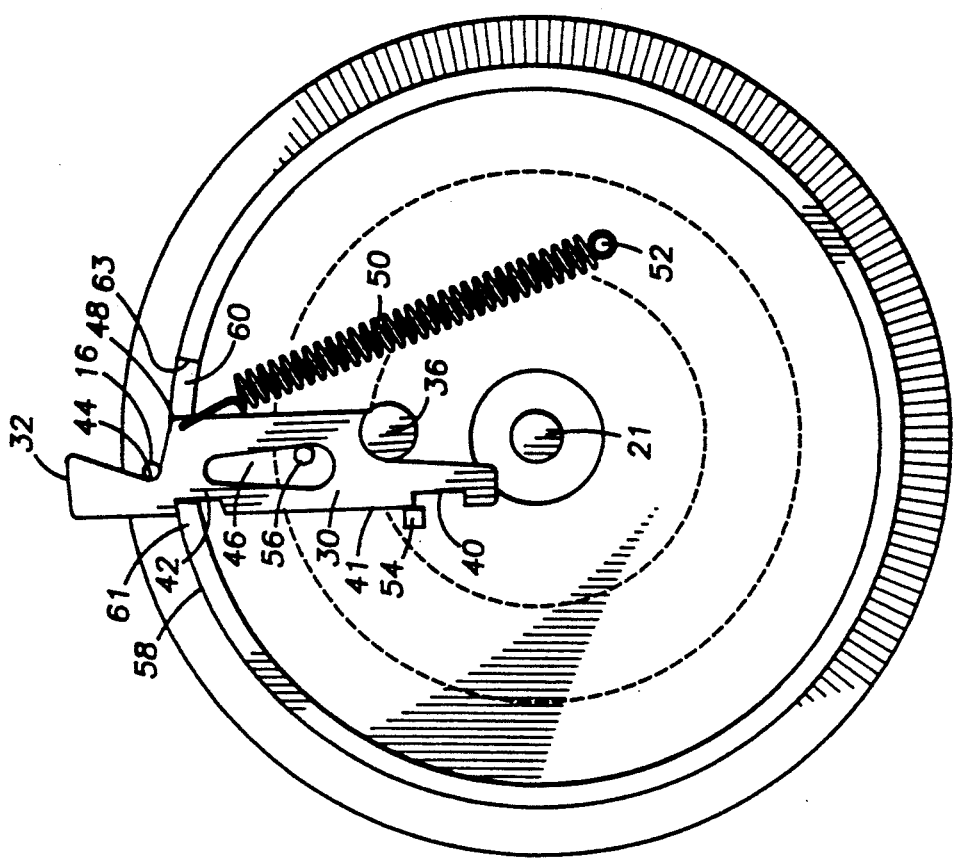
FIGS. 4 and 5 are plan views of the operation of a line release mechanism according to the present invention.

Referring initially to FIG. 1, fishing rod 10 includes a rod grip 11, a tip 12, and a reel 13. Reel 13 is a conventional openfaced reel that includes a conventional bail and has been outfitted with a line release device 20 according to the present invention. A fishing line 16 extends from around reel 13, across line release device 20, toward tip 12. Line 16 is retained substantially parallel to rod 10 by a series of loops or eyelets 18. A lure 14 is attached At the remote end of line 16. Rod 10 is normally straight.

FIG. 1 shows rod 10 in a position of flexure immediately prior to casting of lure 14. The flexure is achieved by grasping lure 14 and drawing it toward the rod grip 11 while preventing line 16 from unwinding from reel 13 and thus keeping fishing line 16 taut.

It will be understood that, when lure 14 is released, the stiffness of rod 10 will cause rod tip 12 to describe an arc as rod 10 resumes its normal straight shape. As rod tip 12 traverses the arc, lure 14 is drawn outward and away from grip 11 of rod 10. Once rod 10 has reached its straight position, it is desired that the momentum imparted by the motion of rod tip 12 to lure 14 be applied to a continued flight of lure 14 away from rod 10. This objective can best be accomplished if line 16 is kept taut until rod 10 has straightened to its maximum extension and is no longer applying an accelerating force to lure 14, at which point it is preferred that line 16 be released so that lure 14 may continue its forward flight.

Line release device 20 achieves this purpose with no additional effort required from the operator.

Referring now to FIG. 2, reel 13 is shown, partially in cross-section, with line release device 20 mounted thereon. Reel 13 includes a reel spool 70 with an annular flange 72 forming a spool on which that part of fishing line 16 which is not in use can be wound. Reel spool 70 includes a central bore 74 and an increased diameter bore 75. A partially threaded shaft 21 extends through bore 74 and serves as the axle of reel spool 70.

Still referring to FIG. 2, line release device 20 includes a casing 22, a casing cover 29, a catch bar 30, a knob 39, and a coil spring 50 (not shown in FIG. 2, but shown in FIGS. 3 and 5). Casing 22 includes a base 23, a casing rim 58 extending from base 23 on one side, and a coaxial male portion 24 extending from base 23 on the other side. Male portion 24 includes a threaded axial bore. When line release device 20 is mounted on reel 13, male portion 24 is received in bore 75 and the axial bore threadingly engages shaft 21 at 26. It will be recognized that other means of affixing a line release device to an open-face reel may be used without departing from the spirit of the invention.

Referring to FIGS. 2, 3, 4, and 5, rim 58 of casing 22 extends circumferentially around and perpendicular to base 23. Rim 58 includes an opening 60, which is defined by rim ends 61 and 63. Opening 60 in rim 58 is of sufficient width to allow bar 30 to extend therethrough and to be manipulated according to the invention without interference, except as is desired.

Referring again to FIGS. 2 and 3, casing cover 29 is substantially circular and normally rests on rim 58 (shown in phantom in FIG. 3). Casing cover 29 includes an ovoid opening 28 therethrough. In the preferred embodiment, casing cover 29 is fastened to casing 22 by screws threaded into base 23. Other means, however, for attaching cover 29 may be used.

In FIG. 3, knob 39 has been omitted from device 20, so other elements of the device that are normally covered by knob 39 may be seen. Catch bar 30 is housed within casing 22 and includes end 32 extending radially therefrom through opening 60 in casing rim 58. Catch bar 30 includes a perpendicular post 36, extending through opening 28 in casing cover 29 and having a threaded end 38. Catch bar 30 further includes an ovoid slot 46 therethrough, part of which is visible through opening 28.

Referring again to FIG. 2, knob 39 is adapted for easy engagement by an operator's finger, and includes a threaded bore 37. Preferably, knob 39 includes a groove or depression designed to enable the operator to push knob 39 in the correct direction without having to look at the knob first.

In normal operation, knob 39 is affixed to end 38, as seen in FIG. 2, by means of threaded engagement of bore 37 with post end 38, and covers the central portion of casing cover 29, including opening 28. When affixed to post end 38, knob 39 serves to prevent the entry of dirt and other foreign matter through opening 28. It will be understood that other means for attaching knob 39 to post end 38 may be used without departing from the spirit of the invention.

Figure 4:
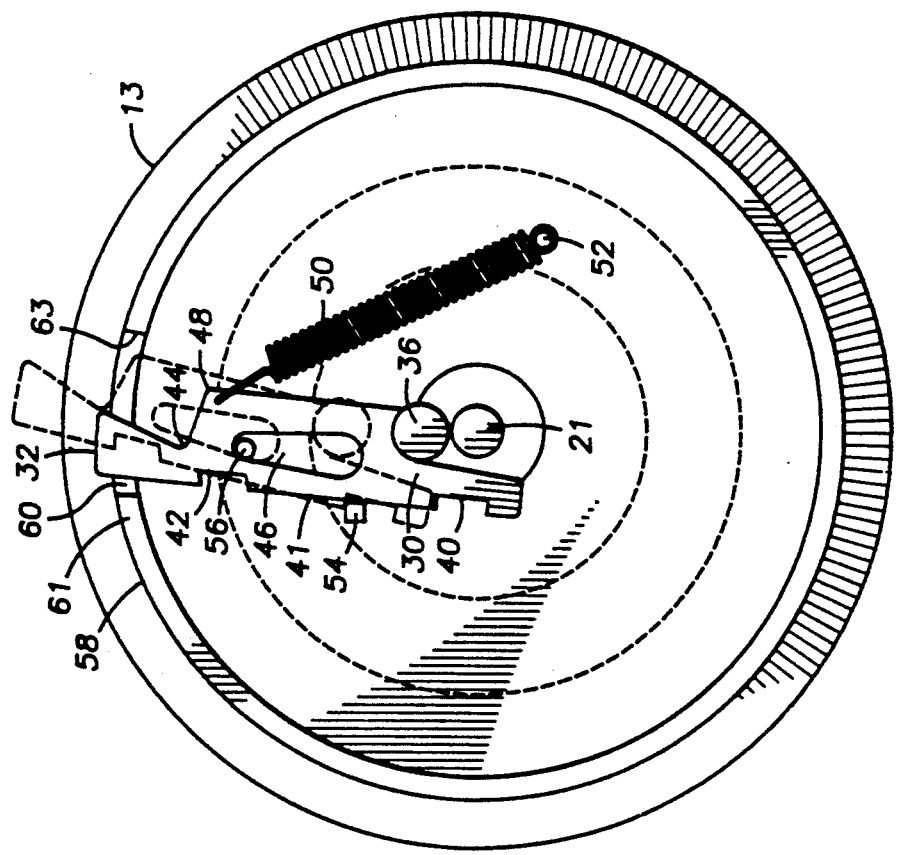

In FIGS. 4 and 5, referred to below, the device of the present invention is shown in detail as normally assembled and operated, except that both knob 39 and casing cover 29 have been left off so that operation of the device may be better understood.

Referring first to FIG. 4, bar 30 is shown by the full lines in an uncocked position within casing 22. Bar 30 includes end 32, post 36, a first notch 40, a second notch 42, an ovoid slot 46 and a shoulder 48. A flat face 41 defines the edge of bar 30 between notches 40 and 42. Bar 30 also includes a V-shaped line trap 44 adjacent end 32. The ovoid slot 46 has its narrow end 47 nearest bar end 32 and its wide end 45 near post 36. Coil spring 50 is attached at one end to shoulder 48 of bar 30, adjacent to line trap 44, and at its other end to the inside of casing base 23 by means of a pin 52.

In addition to pin 52, casing base 23 supports a latch post 54 and a pivot post 56. Still referring to the uncocked position shown by full lines in FIG. 4, bar 30 is housed within casing 22, with pivot post 56 received in slot 46. Spring 50 is in tension, applying a force to bar 30 and causing bar 30 to be positioned such that pivot post 56 is at the narrow end 47 of slot 46 and face 41 bears on latch post 54. In this position, the forces on bar 30 are balanced, and end 32 projects only slightly through opening 60 in casing rim 58.

When it is desired to cock the mechanism, the operator applies pressure to post 36 via knob 39 (not shown), such that bar 30 is moved away from the center of casing 22 and bar end 32 extends further beyond casing rim 58, as shown in phantom in FIG. 4. In the cocked position, latch post 54 is received in notch 40, as the tension in spring 50 causes bar 30 to pivot in a clockwise direction, as viewed in FIG. 4, on pivot post 56 within slot 46. Once bar 30 is in the cocked position, the operator may remove pressure from knob 39 and bar 30 will be retained in a cocked position by the forces applied by spring 50, pivot post 56, and latch post 54 acting in notch 40.

Before commencement of a casting operation, the operator draws from reel 13 a desired length of line 16. The length of line 16 drawn from the reel is preferably sufficient to allow the operator to readily and safely reach the lure affixed to the line, while holding grip 11 in his other hand. The operator then engages the bail, preventing line 16 from unwinding further from the reel under the weight of the lure. When the operator is ready to cast, he cocks the line release device 20, as described above, and releases the bail. Upon release of the bail, the weight of lure 14 causes fishing line 16 to unwind from the reel spool 70 until it engages end 82 of bar 30 and is received in line trap 44. Further unwinding of line 16 is then prevented.

It will be understood that, after an initial cast, when lure 14 is remote from rod 10, the line and lure can be returned to the pre-cast position by engaging the bail and reeling in line 16 to a point which leaves only the desired length of line 16 unwound. Line release device 20 is then cocked and the bail released, as described above.

With line release mechanism 20 in its cocked position and line 16 thereby engaged, the operator then draws lure 14 toward himself. The force applied by the operator in drawing lure 14 in is significantly greater than the weight of lure 14 and causes line 16 to apply a counter-clockwise torque to bar 30 that is sufficient to overcome the torque applied to bar 30 by spring 50.

The counter-clockwise torque applied by line 16 to bar 30 causes bar 30 to pivot on latch post 54. As bar 30 pivots, slot 46 is moved such that fixed pivot post 56 crosses the wide end 45 of the slot 46. As end 32 approaches rim end 61, pivot post 56 engages the side of slot 46 such that bar 30 pivots on pivot post 56 instead of latch post 54, thereby allowing notch 40 to disengage from latch post 54. Once notch 40 has disengaged from latch post 54, spring 50 causes bar 30 to shift radially inward a small amount, until notch 42 engages rim end 61. In this activated position, bar 30 is held in place by forces applied to bar 30 by line 16, spring 50, pivot post 56, and casing rim 61.

As shown in FIG. 5, when the mechanism is activated, line 16 engages the exposed end 32 of bar 30 and is received in line trap 44. Engagement of line 16 with line trap 44 prevents line 16 from unwinding from the reel. Hence, as lure 14 is drawn toward the operator, line 16 applies a force to rod tip 12, drawing it in and flexing rod 10.

With line releasing mechanism 20 in its activated position, and with rod 10 flexed and line 16 held in tension, the operator is prepared to cast. Casting is accomplished by releasing lure 14, allowing rod 10 to straighten rapidly and fling lure 14 outward. During the initial part of the cast, as rod 10 straightens from its flexed position, tension is applied to line 16 and the momentum of lure 14 increases. Once rod 10 is completely straight, there is an instant when line 16 is not in tension. At this instant, the slackening of line 16 allows spring 50 to overcome the opposing force of the line on bar 30.

Spring 50 shifts bar 30 in a clockwise direction, and notch 42 disengages from rim end 61. With notch 42 disengaged, bar 30 shifts radially inward, with pivot post 56 traversing the length of slot 46, until bar 30 resumes the uncocked position described above. In the uncocked, or retracted, position, line release device 20 does not interfere with the unwinding of line 16 from reel spool 70, and lure 14 continues its outward path unchecked. After the cycle of events described above, the line release mechanism is ready to be used again.

It will be understood that, by catching the line 16 in line trap 44 and releasing it at precisely the moment necessary to obtain the maximum trajectory, the present invention allows even an inexperienced operator to cast effectively. Furthermore, multiple casts may be made quickly without the necessity for resetting or adjusting complex moving parts.

The components of the device of the present invention may be made of metal or plastic, or any other suitable material. In the preferred embodiment, the moving parts are made to be as light as possible, so as to decrease inertia. The desired lightness can be achieved by using lightweight materials, or by the removal of mass from the components by placing holes therethrough, as long as structural integrity is not compromised. Preferably, the device is sized to fit one side of a conventional open-face reel.

While a preferred embodiment of the invention has been shown and described, modifications thereof can be made by one skilled in the art without departing from the spirit of the invention.

What is claimed is:

1. A fishing apparatus for casing a lure, comprising:
    a flexible rod including a reel and a rod tip;
    a fishing line wound at one end onto the reel, supported on the rod between the reel and the rod tip, and affixed at its other end to the lure;
    means for preventing unwinding of the line from the reel as long as there is tension in the line; and
    means for automatically releasing the line when tension is removed from the line.

2. The apparatus of claim 1 wherein said preventing means includes a member reciprocally attached to the reel, said member extending past the reel to obstruct the unwinding of the line.

3. The apparatus of claim 2 wherein said releasing means includes means for retracting said member from extending past the reel and obstructing the unwinding of the line.

4. The apparatus of claim 3 wherein said retraction means includes means for biasing said member inwardly.

5. The apparatus of claim 3, further including means for maintaining said member in an obstructing position until tension is applied to the line.

6. A fishing apparatus for casting a lure, comprising:
    a flexible rod including a reel and a rod tip;
    a fishing line wound at one end onto the reel, supported on the rod between the reel and the rod tip, and affixed at its other end to the lure;
    means for preventing unwinding of the line from the reel until the lure has been cast and has travelled a first distance; and
    means for automatically releasing the line after the cast lure has travelled the first distance, said releasing means being triggered by the removal of tension from the line.

7. The apparatus according to claim 3 wherein the preventing means are activated by applying tension to the line.

8. The apparatus according to claim 6 wherein the preventing and releasing means are affixed to the reel.

9. A line release apparatus for engaging and releasing a fishing line, comprising:
    a member having an uncocked position where said member does not engage the line;
    first means for maintaining said member in a cocked position where the line is engaged;
    second means for maintaining said member in an activated position when tension is applied to the line; and
    mean for biasing said member toward said uncocked position and returning said member to said uncocked position when tension is removed from the line.

10. The line release apparatus according to claim 9, further including a base adapted for mounting on a reel, said member being slidably mounted on said base.

11. The line release apparatus according to claim 10 wherein said first means includes a post affixed to said base and engaging said member.

12. The line release apparatus of claim 11 wherein said member includes a first notch for receiving said post in the cocked position.

13. The line release apparatus according to claim 10 wherein said second means comprises a post affixed to said base and engaging said member.

14. The line release apparatus of claim 13 wherein said member includes a second notch for receiving said post in the activated position.

15. The line release apparatus of claim 10 wherein said biasing means biases said member radially inward.

16. The line release apparatus according to claim 10 wherein said biasing means includes a spring having one end affixed to said member and another end affixed to said base.

17. The line release apparatus according to claim 9 wherein said member includes a recess for receiving the line.

18. The line release apparatus according to claim 9 wherein the member includes means for shifting said member from said uncocked position to said cocked position.

19. The line release apparatus according to claim 18, wherein said shifting means includes a knob affixed to said member and adapted for engagement by an operator.

20. A line release apparatus for attachment to a fishing reel for releasable engagement of a fishing line, comprising:
   a catch bar including;
      means for shifting said bar,
      first and second notches in one side of said bar,
      guide means for guiding the movement of said bar, and
      an end having a surface adapted for engaging the line;
   a base having a rim, said catch bar mounted on said base, said rim having an aperture therethrough forming first and second rim ends, said aperture adapted to receive said end of said catch bar, said first rim end being adapted to alternately engage said second notch and said end;
   a pivot post affixed to said base for engaging said guide means;
   a latch post affixed to said base and adapted to engage said first notch; and
   means for biasing said member radially inward and away from said notches;
   whereby when said member is extended through said aperture, it is held in a cocked position against said biasing means by said first notch receiving said latch post, and when the line engages said end and a force is applied to the line sufficient to overcome said biasing means, said bar shifts to an activated position wherein said first notch disengages said latch post and said second notch engages said first rim end, and when said force is removed from the line, said biasing means causes said bar to retract on said base until it disengages the line.

21. An apparatus mounted on an open face reel for engaging and releasing a line wrapped on the spool of the reel, comprising:
   a base adapted to be mounted on the reel and having a pivot, a first post and a second post;
   a member having a slot receiving said pivot, a first notch for receiving said first post and a second notch for receiving said second post;
   biasing means for biasing said member against said first post;
   said member having a first position where said first and second posts are not received within said first and second notches; a second position where said first notch receives said first post and said second notch does not receive said second post; and a third position where said first notch does not receive said first post and said second notch receives said second post, whereby upon placing tension on the line, the line tension causes said member to move to said third position and the release of the line tension causes said biasing means to move said member to said first position.

* * * * *